UNITED STATES PATENT OFFICE.

IVAN GUBELMANN, OF SOUTH MILWAUKEE, WISCONSIN, ASSIGNOR TO THE NEWPORT COMPANY, OF MILWAUKEE, WISCONSIN, A CORPORATION OF DELAWARE.

ANTHRACENE DYE AND A PROCESS OF MAKING.

No Drawing. Application filed April 4, 1925. Serial No. 20,628.

This invention relates to coloring matters of the anthracene series and a process of making the same, more particularly to the coloring matters obtained by the condensation of a halogenated pyranthrone body with a nitrogen containing aromatic compound having a reacting hydrogen atom connected to the nitrogen atom. In my copending application executed of even date for "Anthracene dye and a process of making," Serial No. 20,627, filed April 4, 1925, I described such a process as the above with particular reference to the condensation of a halogenated pyranthrone body with an alpha-amino body. The present invention is a continuation in fact of the above-mentioned process and relates more particularly to the condensation of a halogenated pyranthrone body with beta amino anthraquinone or its homologs or derivatives.

My process relates to the condensation of any halogenated pyranthrone body with any beta amino anthraquinone or its homologs or derivatives, but I prefer to use dibrom pyranthrone and 2-aminoanthraquinone. The reaction proceeds best in the presence of a high boiling solvent, at temperatures ranging between 150° and 210° C. Neutralizing agents such as anhydrous sodium acetate and catalyzers such as basic copper acetate may be used to facilitate the reaction.

The following example will serve to illustrate my invention in a preferred form, but I do not wish to limit the process to this example:

Suspend 50 parts by weight of finely ground dibrom pyranthrone in 600 parts by weight of naphthalene, add 25 parts by weight of 2-aminoanthraquinone, 50 parts by weight of anhydrous sodium acetate in the form of a fine powder and 10 parts by weight of basic copper acetate, as catalyzer. Heat the mixture under agitation to 190° C. for a period of 15 hours. The color of the mass changes gradually from red to dark brown. Pour the reaction mass into 500 parts by weight of water containing 25 parts by weight of sodium carbonate. Remove the naphthalene completely by steam distillation and filter off the remaining brown product. Wash the filter cake thoroughly with hot water to remove inorganic salts. After drying and grinding, the reaction product forms a brown powder, which dyes cotton from a hydrosulfite vat a violet shade, which oxidizes to a rich brown shade on oxidation with air or other suitable oxidizing agents.

The product of the reaction between dibrom pyranthrone and 2-aminoanthraquinone is most probably represented by the following chemical formula:

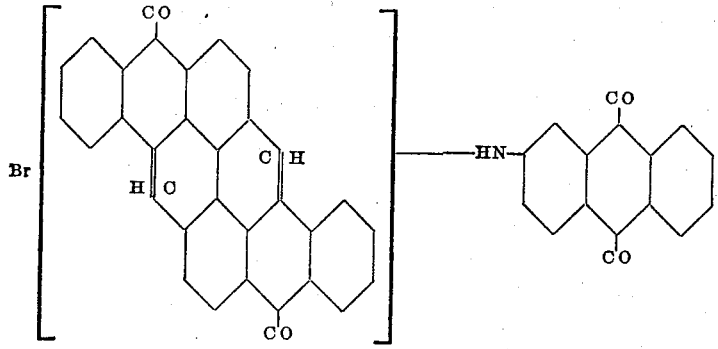

The exact position of the bromine atom remaining in the pyranthrone radicle and of the coupling bond is unknown. The second bromine atom splits off and unites with one hydrogen atom of the amino group to form hydrobromic acid. While the above is probably the main reaction, it is obvious that the resultant dye product may be considerably influenced by side reactions.

The coloring matters thus obtained are in general brown powders, which, from a purple hydrosulfite vat dye purple shades on cotton which oxidize to rich brown on exposure to air or to any suitable oxidizing agent. The shades obtained are extremely fast to washing, light, and other influences. The powders are insoluble in hot and cold water, sparingly soluble in dilute acids and organic solvents, but usually more so in high boiling organic solvents. In concentrated sulphuric acid they disolve with a blue to purple color, depending upon the constituents used, and are again precipitated on dilution with water. They are, however, easily soluble in alkaline hydrosulfite solution. In the specification and claims, by a "beta amino anthraquinone body" is meant beta amino anthraquinone, its homologs and derivatives.

I am aware that numerous details of the process may be varied through a wide range without departing from the spirit of this invention, and I therefore do not purpose limiting the patent granted, otherwise than as necessitated by the prior art.

I claim as my invention:

1. The process of producing coloring matters of the anthracene series by heating a halogenated pyranthrone body with a beta amino anthraquinone body in the presence of a high boiling solvent and a neutralizing agent.

2. The process of producing coloring matters of the anthracene series by heating a halogenated pyranthrone body with a beta amino anthraquinone body in the presence of a high boiling solvent and a neutralizing agent and a catalyzer.

3. The process of producing coloring matters of the anthracene series by heating dibrom pyranthrone with 2-aminoanthraquinone in the presence of a high boiling solvent, anhydrous sodium acetate as a neutralizing agent and a catalyst.

4. As new articles of manufacture, the coloring matters of the anthracene series which are obtained by heating a halogenated pyranthrone body with a beta amino anthraquinone body.

5. As new articles of manufacture, the coloring matters of the anthracene series which are obtained by heating a brom pyranthrone body with 2-aminoanthraquinone.

6. The process of producing coloring matters of the anthracene series by heating a halogenated pyranthrone body with a beta amino anthraquinone body.

7. As new articles of manufacture, coloring matters of the anthracene series having most probably the following general formula:

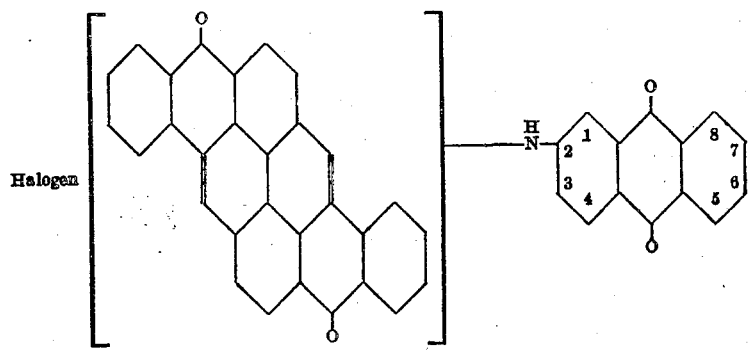

said coloring matters being in general brown powders, which, from a purple hydrosulfite bath dye purple shades on cotton, which shades oxidize to rich brown on exposure to air or other oxidizing agent.

8. As new articles of manufacture, coloring matters of the anthracene series having most probably the following formula:

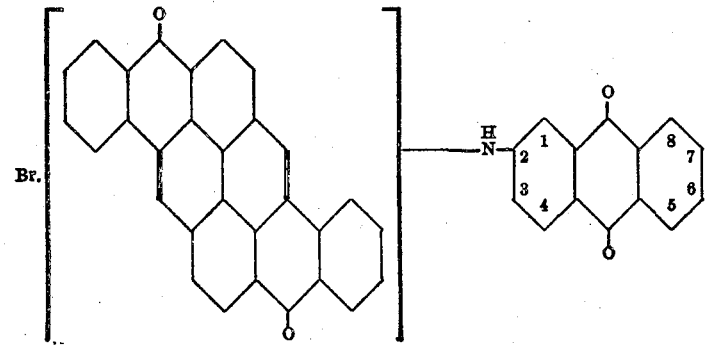

wherein the C atoms in 1, 3, 4, 5, 6, 7 and 8 positions may be substituted by univalent groups as halogen and alkyl, said coloring matters being in general brown powders, which, from a purple hydrosulfite bath dye purple shades on cotton, which shades oxidize to rich brown on exposure to air or other oxidizing agent.

9. Materials dyed with coloring matters described in claim 7.

10. Materials dyed with coloring matters described in claim 8.

In testimony whereof I have hereunto subscribed my name.

IVAN GUBELMANN.